Jan. 17, 1933.　　　C. DUMLER　　　1,894,305
COTTON HARVESTER
Filed April 10, 1931　　5 Sheets-Sheet 1

Inventor
Charles Dumler

By Lacey & Lacey,
Attorneys

Jan. 17, 1933. C. DUMLER 1,894,305
COTTON HARVESTER
Filed April 10, 1931  5 Sheets-Sheet 2
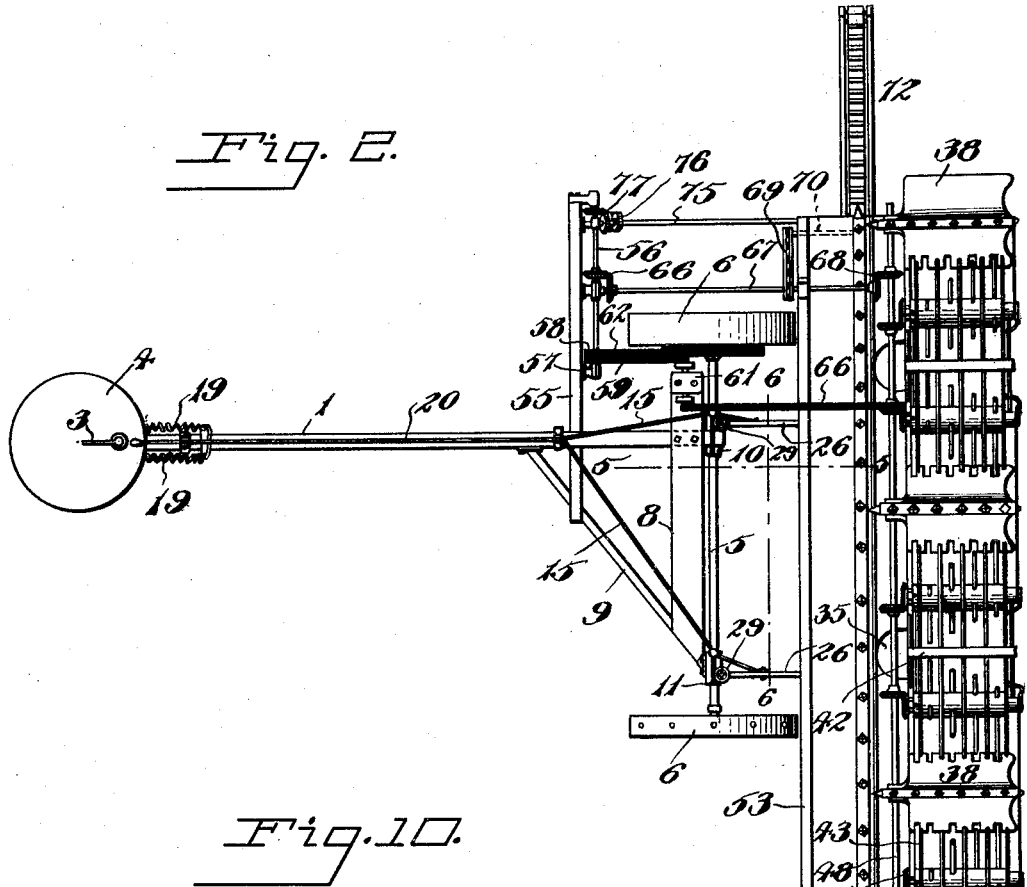
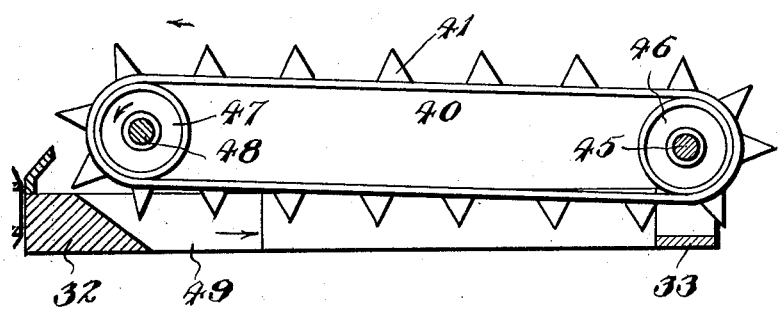
Inventor
Charles Dumler
By Lacey+Lacey, Attorneys Jan. 17, 1933.    C. DUMLER    1,894,305
COTTON HARVESTER
Filed April 10, 1931    5 Sheets-Sheet 3
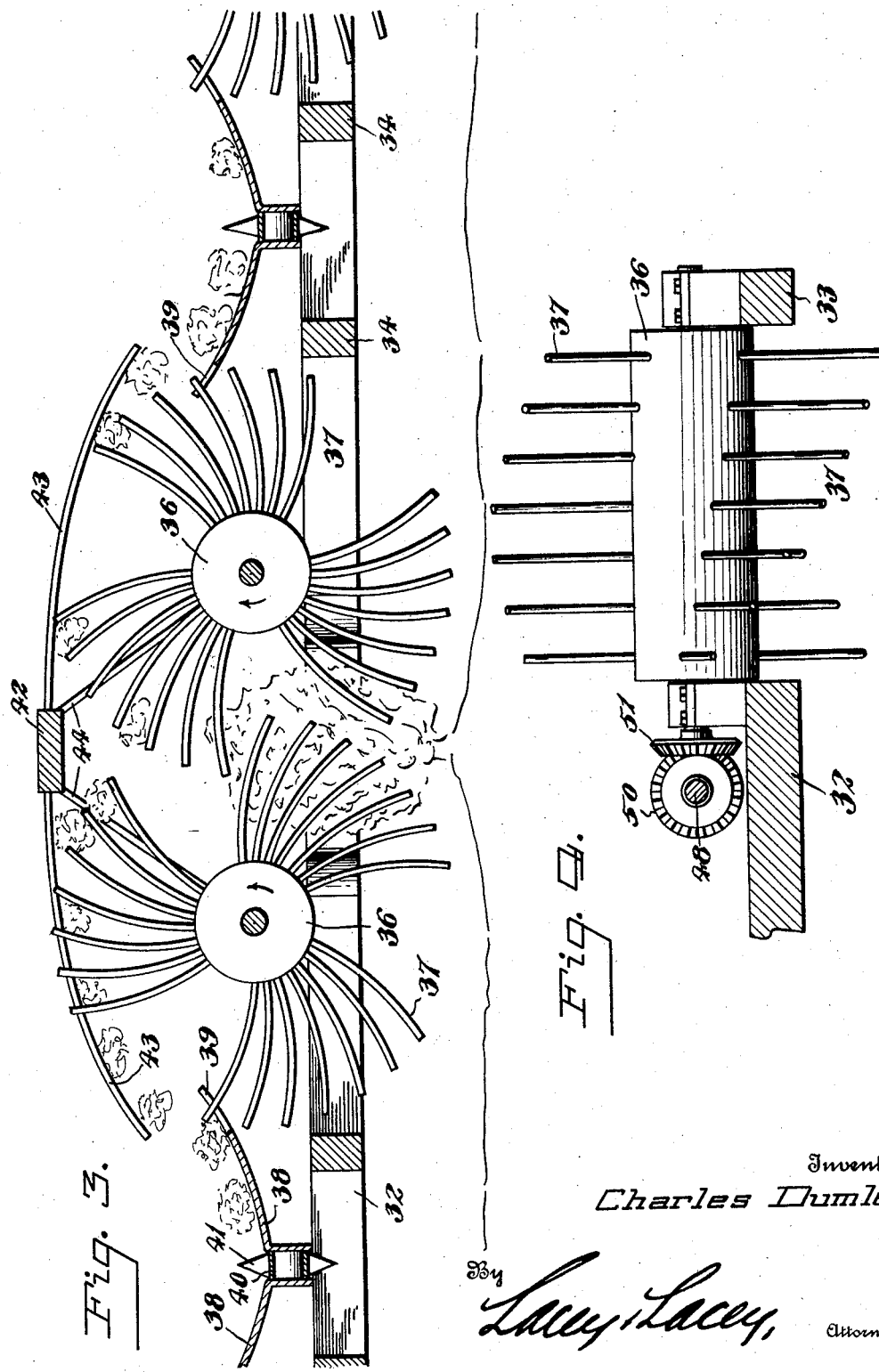

Jan. 17, 1933.  C. DUMLER  1,894,305
COTTON HARVESTER
Filed April 10, 1931  5 Sheets-Sheet 4

Inventor
Charles Dumler
By
Lacey & Lacey,
Attorneys

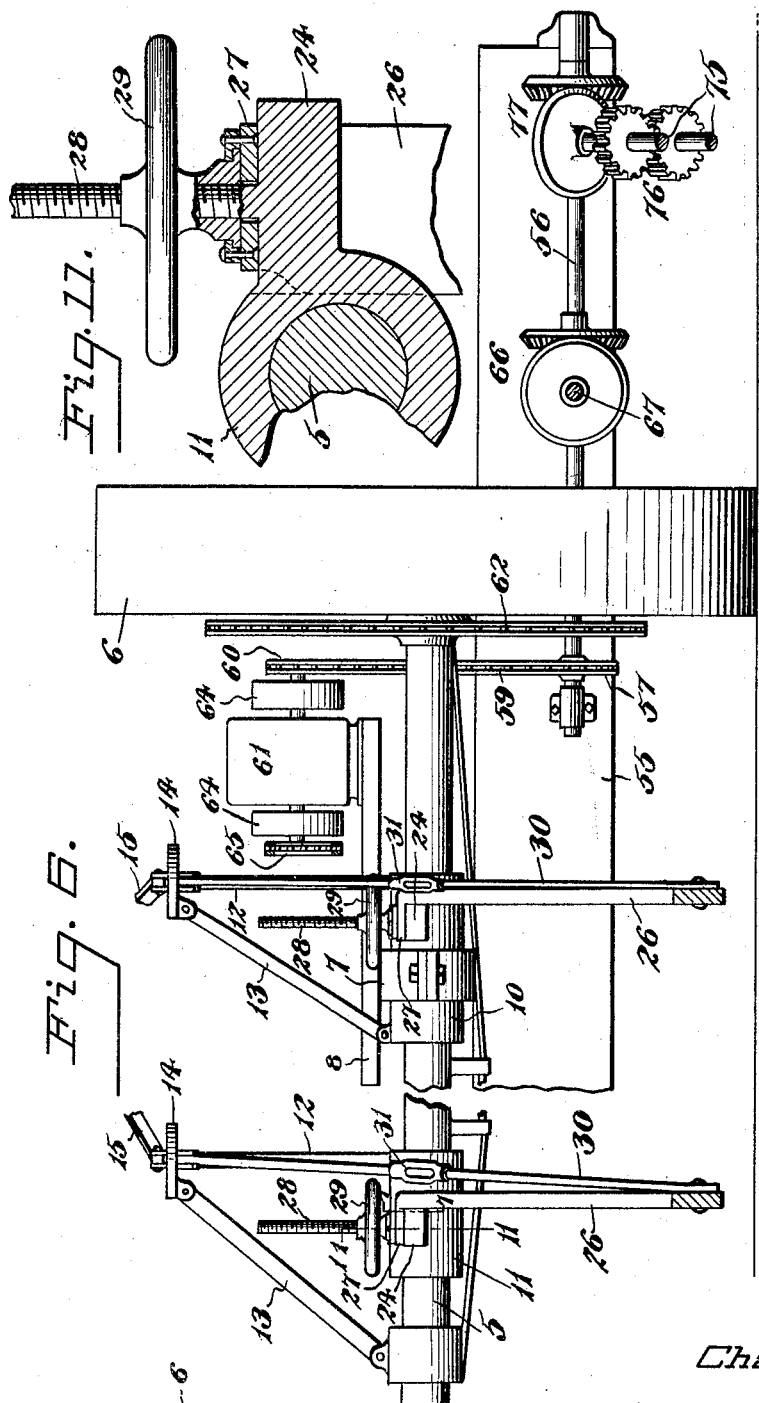

Patented Jan. 17, 1933

1,894,305

UNITED STATES PATENT OFFICE

CHARLES DUMLER, OF CANTON, OKLAHOMA

COTTON HARVESTER

Application filed April 10, 1931. Serial No. 529,183.

This invention relates to cotton harvesters and has for its object the provision of an efficient machine which will act upon two or more rows of plants simultaneously and which may be readily driven over a field to strip the plants of the cotton during its travel. Another object of the invention is to provide a cotton harvester which may be driven header fashion over the field and which will strip the cotton from the plants and deliver the stripped cotton to a conveyer at the rear of the stripping mechanism, by which conveyer it will be carried to one side to be loaded into a vehicle driven over the field alongside the harvester. The invention also provides means whereby the picking or stripping mechanism may be adjusted to run close to the ground or at a higher point, as circumstances may require, and the invention also provides means whereby the working parts may be driven from a ground wheel of the machine or may be driven by an engine mounted upon the machine frame. Other objects will appear incidentally in the course of the following description, and the invention resides in certain novel features which will be hereinafter first fully described and then more particularly pointed out in the appended claims.

In the drawings:

Fig. 2 is a top plan view of the same,

Fig. 3 is an enlarged detail front elevation, with parts in section,

Fig. 4 is an enlarged detail view of one of the picker rollers,

Figure 9:
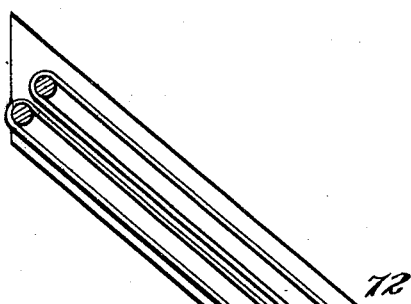
Figure 8:
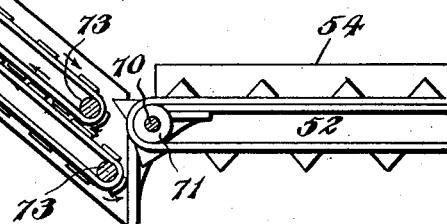

Fig. 6 is an enlarged front elevation, with parts in section, on the line 6—6 of Fig. 2, Fig. 7 is a detail section on the line 7—7 of Fig. 6, Figs. 8 and 9 are details of the conveyer and elevator, Fig. 10 is an enlarged detail view of one of the longitudinal conveyers, Fig. 11 is an enlarged detail section on the line 11—11 of Fig. 6.

In carrying out the invention, there is provided a push bar or tongue 1 which is supported at its rear end upon a caster 2 having its spindle equipped with a lever 3 whereby to aid in steering the machine, and upon the rear end of this tongue or push bar is a platform 4 upon which the operator may stand or be seated. The front end of the push bar or tongue 1 is mounted upon an axle 5 upon the ends of which are fitted ground wheels 6 which may be utilized to furnish motive power for the working parts. The front end of the tongue or push bar is provided with a bearing 7 which receives the axle and thereby supports the tongue on the axle while, at the same time, permitting rotation of the axle, if a rotatable axle be desired. Immediately at the rear of the axle a cross beam or platform 8 is secured on the tongue, and one end of this platform is further supported by a brace 9 extending between the same and the tongue, as shown in Fig. 2. As shown, the axle may be fitted with a skein or sleeve 10 disposed within the bearing 7, and the left-hand ground wheel 6 may be rigidly secured to the axle so that the axle will rotate therewith, while the right-hand ground wheel may be free upon the axle to rotate about the same. Draft devices (not shown) may be mounted upon the rear portion of the tongue or push bar 1 so that draft animals may be hitched thereto or a tractor may be connected therewith to effect travel of the machine over the field, the cotton picking or stripping mechanism being mounted at the front of the machine so as to operate in advance of the tractor or draft animals.

Figure 1:
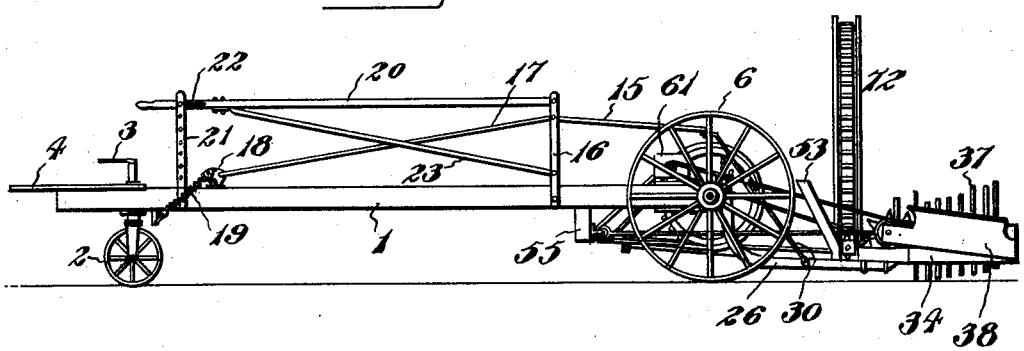
Figure 1 is a side elevation of a cotton harvester embodying the invention.

A sleeve 11, corresponding to the sleeve 10, is mounted upon the axle at the right of the sleeve 10, and upon each of said sleeves is erected a standard 12, the standards being disposed at one end of the respective sleeves and braced by inclined bars 13 extending between and attached to the opposite ends of the respective sleeves and to disks 14 secured upon the respective standards immediately adjacent the upper ends of the same. Pivotally attached to the disks or heads 14 are the front ends of bars 15 which converge rearwardly and are pivoted to a rocking standard 16 pivoted at its lower end upon the tongue or push bar 1, as shown most clearly in Fig. 5. The connecting bars 15 are pivoted to the standard 16 near the upper end of the same, and a link 17 is also pivoted at its front end to said standard adjacent the upper end of the same and extends downwardly and rearwardly to be pivoted to a crank 18 mounted on the tongue and normally held in its rearward position by a contractile spring 19 attached to the crank and to the tongue at the rear of the crank. To the upper extremity of the standard 16 is pivoted the front end of an adjusting bar 20 which extends rearwardly and has its rear end supported by a rest 21 secured to and rising from the tongue, as shown in Fig. 1. A latch, indicated conventionally at 22, is mounted upon the rear end of the adjusting bar and is adapted to engage selectively in openings provided therefor in the rest 21 whereby the parts may be held in a set position. A brace 23 extends between the lower end of the standard 16 and the rear end of the adjusting bar 20, as shown in Fig. 1, so that the desired firmness will be imparted to the structure. It will be readily understood that if the adjusting bar 20 be pushed forwardly or drawn rearwardly, a rocking movement will be imparted to the standard 16 and will be transmitted therefrom through the bars 15 to the standards 12 which will be thereupon caused to rock upon the axle 5 and, consequently, impart vertical adjustment to any structure which may be supported from said standards 12.

The sleeves 10 and 11 are each formed with a forwardly projecting lug 24, and immediately adjacent said lug is a groove 25 extending vertically across the forward portion of the sleeve. Slidably engaged in each groove or recess 25 is a carrying arm 26 which extends downwardly therefrom and then forwardly to support the frame upon which the picking and conveying mechanisms are mounted. Each carrying arm 26 is provided at its upper end with a laterally extending terminal cap 27 which extends over and may rest upon the lug 24, and formed integral with and rising from said lug is a screw 28 which passes through an opening provided therefor in the terminal cap, as shown in Fig. 11. Fitted upon and engaged with each screw is an adjusting wheel 29 which is swiveled upon the terminal cap 27, as shown in Fig. 11, whereby if the adjusting wheel be turned it will be caused to ride up or down upon the screw 28 and a corresponding vertical movement will be imparted to the supporting arm 26. It will thus be seen that I have provided for a very wide range of adjustment of the structure carried by the arms 26 inasmuch as an approximate adjustment may be effected by the manipulation of the adjusting bar 20 and then a close adjustment obtained through operation of the hand wheels 29. To impart additional strength to the structure and guard against sagging of the arms, as well as to hold the said arms in proper relation to the respective sleeves 10 and 11, guy rods 30 are attached at their lower front ends to the respective arms and at their upper rear ends to the respective disks 14, and these guy rods are equipped between their ends with turnbuckles 31 whereby the correct tension may be attained in the guy rods.

Secured upon and carried by the front extremities of the supporting arms 26 is a frame or platform comprising a rear section 32 which extends the full width of the machine, and a front member 33 which is connected with the rear member 32 at intervals by beams, as indicated at 34. The front bar 33 is formed in sections so that openings will be provided to permit the frame to pass at opposite sides of a row of plants, and alined with said openings are notches or recesses 35 in the front portion of the platform or rear bar 32 which will receive the main stems of the plants and readily bend them so that the machine may clear the plants after the cotton has been stripped therefrom. Mounted upon the frame members 32 and 33 are bearings in which are journaled the picker or stripper rollers 36, these rollers being arranged in pairs to act upon opposite sides of a plant, as will be understood upon reference to Fig. 3, and each roller is equipped with a plurality of picker fingers 37 which may conveniently be stout wires somewhat curved and arranged to travel upwardly through the plants to strip the cotton bolls therefrom. The stripper fingers are arranged in spiral series around the rollers so that they will effectually pass up through the entire plant and successively engage all the bolls in a plant as the machine rides past the same, and they are so disposed that the teeth on one roll work opposite the space between two series of teeth on the cooperating roll, thereby avoiding interference. At the ends of the platform or supporting frame and between adjacent pairs of picker rollers are hoppers, each consisting of a pair of concave plates 38 secured upon and extending longitudinally between the frame members 32—33 and provided in their edges with notches 39 through which the ends of the picker fingers pass while traveling through the downward portion of their revolution. The picker rolls rotate at high speed and the cotton is carried under the hoods and thrown into the hoppers, and disposed in the bottoms of the several hoppers to travel longitudinally of the machine are conveyers 40 consisting of endless belts or chains equipped at intervals with teeth 41 which are adapted to engage the cotton delivered to the hoppers and carry it rearwardly to be delivered into a main conveyer at the rear of the platform 32, as will be presently described. Mounted upon the platform 32 and the front bars 33 and extending between the same in vertically spaced relation thereto are hoods 42, which may be grooved or slotted, as indicated at 43, to accommodate the ends of the picker teeth, and which are curved slightly downward and with their free edges projecting over the edges of the respectively adjacent hoppers, as shown in Fig. 3. These hoods may be mounted in any convenient manner and may well be carried by supporting arms 44 mounted upon the bearings for the picker rollers and converging upwardly therefrom, as will be understood upon reference to Fig. 3. The hoods may conveniently consist of central bars and curved rods extending from the opposite sides of the bars.

The front ends of the several conveyers 40 may be mounted upon stub shafts 45 and rollers 46 mounted upon the front frame members 33, while their rear ends are carried by rollers 47 fixed to a shaft 48 which extends the entire length of the member 32 so that if said shaft be rotated, the desired travel of the conveyers will be effected. As shown at 49 in Fig. 10, the forward edge of the platform member 32 is beveled at intervals to accommodate the lower run of the respective conveyers. The shaft 48 is also the driving element for the several picker rollers, and, to this end, beveled gears 50 are secured to the shaft at intervals along the same, and the picker rollers have their shafts equipped at their rear ends with similar gears 51 meshing with the respective gears 50, as will be understood upon reference to Figs. 2 and 4. It will also be noted that the gears 50 and 51 are alternately reversed so that the cooperating picker rollers will be rotated in opposite directions to cause the fingers thereon to all move upwardly through the plants.

Figure 5:
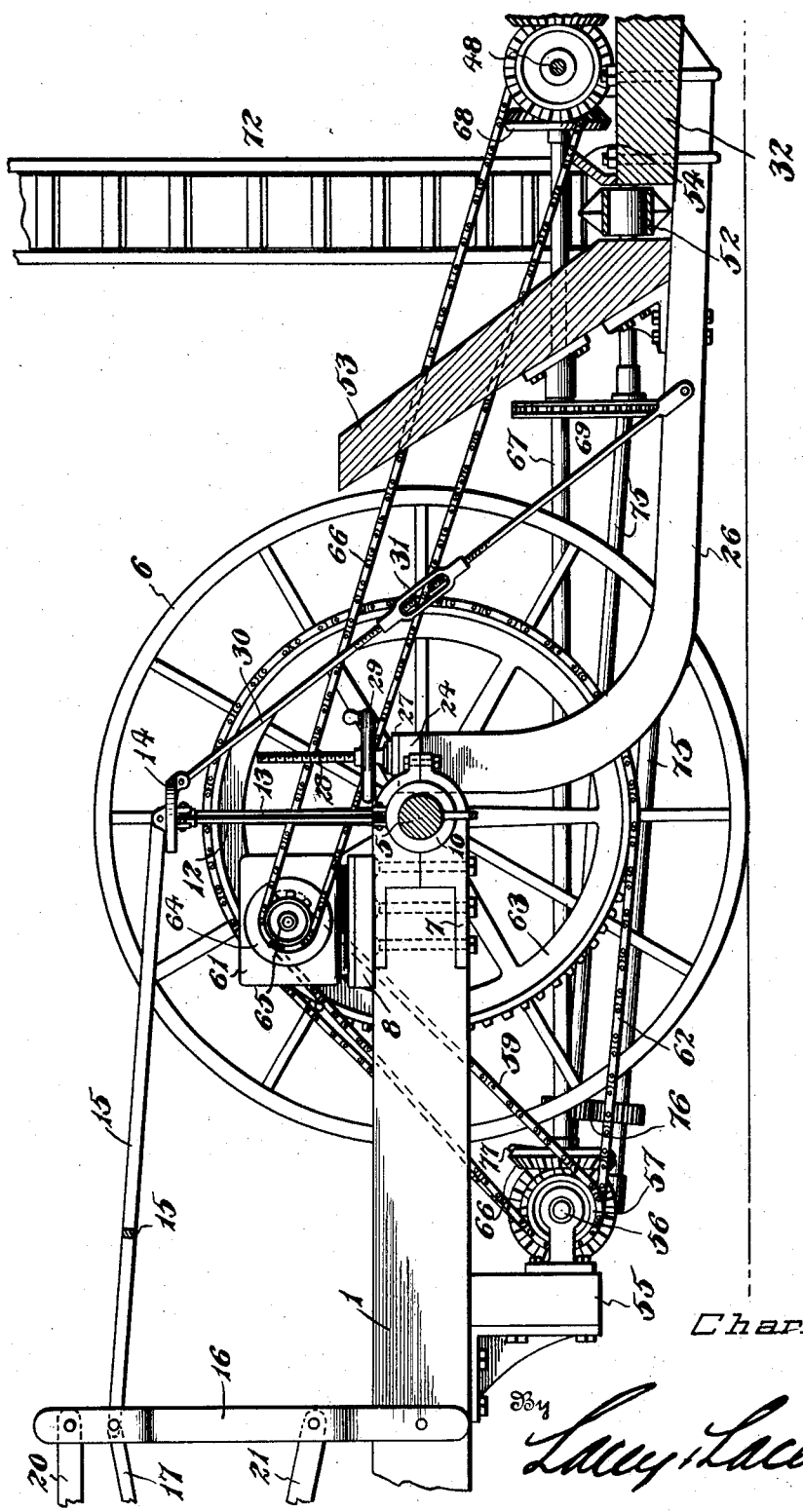
Fig. 5 is an enlarged section on the line 5—5 of Fig. 2.

At the rear of the platform member 32 is a transverse conveyer 52 consisting of an endless belt or chain equipped with teeth corresponding to the conveyers 40, as will be understood. One end of the conveyer 52 is supported by an idle roller or drum mounted between and supported by the platform member 32 and a guard rail 53 which is carried by the arms 26 at the rear of said member 32 and parallel therewith, said guard rail 53 extending upwardly and rearwardly, as shown in Figs. 1 and 5. A smaller guard rail or fender 54 is mounted upon the platform 32 at the rear edge of the same so that the cotton will be directed positively onto the conveyer 52 which may be said to run in a cotton-receiving trough.

Carried by the push bar or tongue 1, at the rear of the platform 8, is a frame bar 55 upon which is mounted a transmission shaft 56, and at the inner end of this shaft 56 are sprocket wheels 57 and 58, a sprocket chain 59 being trained about the sprocket 57 and a cooperating sprocket 60 on one end of the driving shaft of an internal combustion engine 61 which is supported upon the platform 8 in any convenient manner. This engine 61 may be of any approved type and is illustrated in a conventional manner only. If preferred, an electric motor may be used instead of an internal combustion engine, but, generally, the internal combustion engine will be more convenient. A chain 62 is trained about the sprocket 58 and a sprocket gear 63 which is secured to the side of the adjacent ground wheel 6 whereby the transmission shaft 56 may be driven from the engine or from the ground wheel, as may be preferred. It may be considered desirable to employ both driving instrumentalities inasmuch as if the engine should fail to operate for any reason, the power generated by the traction of the ground wheel will be available. The engine shaft is equipped with suitable flywheels 64, and at the end remote from the sprocket 60 is equipped with a sprocket 65 about which is trained a sprocket chain 66 extending to a sprocket secured upon the shaft 48, as will be understood upon reference to Figs. 2 and 5. It will thus be seen that the shaft 48 may be driven directly from the engine. When the shaft 48 is to be driven from the transmission shaft 56, gearing, indicated at 66, is employed to connect the shaft 56 with a longitudinal shaft 67 extending forwardly to the shaft 48 and connected therewith by beveled gearing, indicated at 68. The shaft 67 is operatively connected by sprocket gearing 69 with a longitudinal shaft, indicated at 70, which extends forwardly and is secured to the driving drum or roller 71 which supports one end of the conveyer 52. The conveyer 52 delivers the cotton to an elevator 72 consisting of two cooperating endless belts, as shown most clearly in Fig. 8, which belts are driven by rollers or shafts 73 at their lower ends. Said shafts 73 are connected by universal joints 74 with shafts 75 having their rear ends supported in any convenient manner from the frame bar 55 and being operatively connected by intermeshing gears 76 so that the shafts will be simultaneously rotated at the same speed but in opposite directions. The upper shaft 75 is connected by beveled gearing, indicated at 77, with the transmission shaft 56 so that the elevator will be positively operated.

Having thus described the invention, I claim:

1. In a cotton harvester, the combination of a push bar, an axle engaged with the front end of the push bar, ground wheels mounted on the axle, a steering wheel supporting the rear end of the push bar, supporting arms fitted to the axle and extending downwardly and forwardly therefrom, a frame carried by the front ends of said arms, cotton picking mechanism mounted on said frame, means whereby the supporting arms may be adjusted vertically relative to the axle, rocking posts mounted over the axle, connections between said posts and the supporting arms, and means for rocking said posts.

2. In a cotton picker, the combination of a push bar, an axle engaged with the front end of the push bar, sleeves mounted upon said axle, supporting arms engaged with the respective sleeves to slide vertically across the same, means whereby said arms will be supported by said sleeves, means for vertically adjusting the arms relative to the sleeves, and means for rocking the sleeves whereby to further adjust the supporting arms.

3. In a cotton harvester, the combination of a push bar, an axle engaged with the front end of the push bar, sleeves fitted upon the axle and provided with vertical grooves in their front portions, supporting arms extending downwardly and forwardly from the sleeves, cotton picking mechanism carried by said arms, the upper ends of the arms being engaged in the grooves in the sleeves, lugs projecting from the sleeves adjacent said grooves, terminal caps extending laterally from the upper ends of the arms and resting on said lugs, screws rising from said lugs through the caps, adjusting wheels threaded on the screws and swiveled to the caps, and means for rocking the sleeves and the supporting arms.

4. In a cotton harvester, the combination of a platform, a transverse series of longitudinally disposed cotton picking rollers mounted on said platform and arranged in pairs, hoppers disposed at the sides of the rollers and arranged to strip cotton therefrom, conveyers in the bottoms of said hoppers for carrying the cotton rearwardly, a transverse conveyer at the rear of the several hoppers and receiving cotton from all the hoppers, and means for operating the cotton picking rollers and the several conveyers.

5. In a cotton harvester, the combination of a horizontal platform, a transverse series of longitudinally disposed picking rollers mounted on said platform and arranged in pairs to operate upon opposite sides of rows of plants, picker teeth mounted on said rollers, hoods supported on the platform at the rear of and above each pair of rollers and spanning the respective rollers, hoppers disposed at the sides of the rollers to receive the cotton therefrom, the sides of the hoppers being under and spaced vertically from the side edges of the hoods, and rearwardly traveling conveyers in the bottoms of the hoppers.

6. In a cotton harvester, the combination of horizontally disposed picking rollers arranged in pairs to operate upon the opposite sides of rows of plants, spirally disposed picker teeth carried by the rollers, hoods arranged over and spanning the several pairs of rollers, hoppers arranged at the sides of the rollers and having notches in their edges to accommodate the picker teeth, the side edges of the hoppers being under and in spaced relation to the side edges of the hoods, rearwardly traveling conveyers in the bottoms of the hoppers, and a transverse conveyer at the rear of the hoppers and hoods receiving cotton from all the hoppers.

7. A cotton harvester comprising a traveling frame, a platform supported below and at the front of the frame, pairs of picking rollers mounted on the platform, the platform having a recess in its front edge between the rollers of each pair of rollers, hoods supported on the platform having notches therein and spanning the respective pairs of rollers, hoppers on the platform at the sides of the rollers, the side edges of the hoppers being under and in vertically spaced relation to the side edges of the hoods, rearwardly traveling conveyers in the bottoms of the hoppers, a rearwardly and upwardly inclined rail at the rear of the platform, and a transverse conveyer between said rail and the platform receiving cotton from all the hoppers.

In testimony whereof I affix my signature.

CHARLES DUMLER. [L. S.]